(12) United States Patent
Kim et al.

(10) Patent No.: US 12,040,450 B2
(45) Date of Patent: Jul. 16, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Seung Kim, Daejeon (KR); Chul Haeng Lee, Daejeon (KR); Yu Ha An, Daejeon (KR); Jeong Woo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 521 days.

(21) Appl. No.: 17/289,465

(22) PCT Filed: Nov. 8, 2019

(86) PCT No.: PCT/KR2019/015159
§ 371 (c)(1),
(2) Date: Apr. 28, 2021

(87) PCT Pub. No.: WO2020/096411
PCT Pub. Date: May 14, 2020

(65) Prior Publication Data
US 2022/0006121 A1    Jan. 6, 2022

(30) Foreign Application Priority Data

Nov. 9, 2018 (KR) .................. 10-2018-0137594
Nov. 7, 2019 (KR) .................. 10-2019-0141681

(51) Int. Cl.
*H01M 10/0567* (2010.01)
*H01M 4/38* (2006.01)
(Continued)

(52) U.S. Cl.
CPC .......... *H01M 10/0567* (2013.01); *H01M 2004/027* (2013.01); *H01M 4/386* (2013.01);
(Continued)

(58) Field of Classification Search
None
See application file for complete search history.

(56) References Cited

U.S. PATENT DOCUMENTS

| 11,742,518 B2 * | 8/2023 | Cui .................. H01M 10/0525 429/322 |
| 2011/0229769 A1 | 9/2011 | Ihara et al. |
| 2015/0111096 A1 | 4/2015 | Schmidt |

(Continued)

FOREIGN PATENT DOCUMENTS

| CN | 102195083 A | 9/2011 |
| CN | 106133979 A | 11/2016 |

(Continued)

OTHER PUBLICATIONS

Search Report for European Application No. 19883102.6 dated Oct. 21, 2021. 2 pgs.

(Continued)

*Primary Examiner* — Tracy M Dove
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution includes a lithium salt, an organic solvent, a first additive, and a second additive, wherein the first additive is lithium 4,5-dicyano-2-(trifluoromethyl)imidazolide, and the second additive is tetravinylsilane.

8 Claims, 9 Drawing Sheets

(51) Int. Cl.
  *H01M 4/58* (2010.01)
  *H01M 4/02* (2006.01)
  *H01M 4/587* (2010.01)
  *H01M 10/0525* (2010.01)

(52) U.S. Cl.
  CPC ........ *H01M 4/587* (2013.01); *H01M 10/0525* (2013.01); *H01M 2300/0025* (2013.01)

(56) References Cited

U.S. PATENT DOCUMENTS

| | | |
|---|---|---|
| 2016/0013517 A1 | 1/2016 | Nakazawa et al. |
| 2016/0380309 A1 | 12/2016 | Schmidt et al. |
| 2017/0222264 A1 | 8/2017 | Morinaka et al. |
| 2017/0294681 A1 | 10/2017 | Burshtain et al. |
| 2018/0034106 A1 | 2/2018 | Schmidt |
| 2018/0277903 A1 | 9/2018 | Xu et al. |
| 2018/0301757 A1 | 10/2018 | Burshtain et al. |
| 2019/0020063 A1 | 1/2019 | Kim et al. |
| 2019/0089004 A1 | 3/2019 | Kim et al. |
| 2019/0237805 A1 | 8/2019 | Lim et al. |
| 2020/0006811 A1 | 1/2020 | Burshtain et al. |
| 2020/0052331 A1* | 2/2020 | Lim ............ H01M 10/0568 |
| 2021/0028491 A1 | 1/2021 | Morinaka et al. |
| 2021/0218060 A1 | 7/2021 | Paillet et al. |

FOREIGN PATENT DOCUMENTS

| | | | |
|---|---|---|---|
| CN | 107112589 A | 8/2017 | |
| CN | 107408727 A | 11/2017 | |
| CN | 108604709 A | 9/2018 | |
| EP | 3166170 A1 | 5/2017 | |
| KR | 20150028769 A | 3/2015 | |
| KR | 20150135278 A | 12/2015 | |
| KR | 20160133521 A | 11/2016 | |
| KR | 20170110995 A | 10/2017 | |
| KR | 20170128238 A | 11/2017 | |
| KR | 20180086141 A | 7/2018 | |
| KR | 20180105631 A | 9/2018 | |
| KR | 20180114631 A | 10/2018 | |
| KR | 20180115591 A | 10/2018 | |
| WO | 2018163127 A1 | 9/2018 | |
| WO | 2018169370 A1 | 9/2018 | |
| WO | WO-2018169369 A1 * | 9/2018 | ............ C07F 5/02 |
| WO | 2020175907 A1 | 9/2020 | |

OTHER PUBLICATIONS

Fredrik Lindgren et al., "SEI Formation and Interfacial Stability of a Si Electrode in a LiTDI-Salt Based Electrolyte with FEC and VC Additives for Li-Ion Batteries"; , Applied Material & Interfaces; 2016, vol. 8, pp. 15758-15766.

Gebrekidan Gebresilassie Eshetu et al., "In-Depth Interfacial Chemistry and Reactivity Focused Investigation of Lithium-Imide- and Lithium-Imidazole-Based Electrolytes", Applied Material & Interfaces, 2016, vol. 8, pp. 16087-16100.

International Search Report for Application No. PCT/KR2019/015159, dated Feb. 14, 2020, 2 pages.

\* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2019/015159, filed on Nov. 8, 2019, which claims priority from Korean Patent Application Nos. 10-2018-0137594, filed on Nov. 9, 2018, and 10-2019-0141681, filed on Nov. 7, 2019, the disclosures of which are incorporated by reference herein.

TECHNICAL FIELD

The present invention relates to a non-aqueous electrolyte solution for a lithium secondary battery and a lithium secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium ion batteries, which are battery systems having the theoretically highest energy density, are in the spotlight, and are currently being used in various devices.

Recently, a significant amount of research has been conducted to develop high energy density, that is, high capacity lithium secondary batteries, and these secondary batteries are also commercialized and widely used.

As one of methods, silicon-based materials, in which capacity per weight is large while a loss in operating voltage of a finished battery is small because a reaction potential is not much higher than that of graphite, are being used as a negative electrode material for a lithium secondary battery in order to improve energy per weight of a lithium ion battery.

However, the silicon-based material is disadvantageous in that a change in volume of the active material itself is large when lithium and silicon are subjected to an alloying reaction during charge and discharge and this large volume change causes degradation of a negative electrode due to a physical change in the electrode itself as well as cracking of the silicon itself and formation of electrically-shorted particles.

That is, an operating potential of silicon is slightly higher than that of graphite, but, since it is outside a potential window of a carbonate-based electrolyte solution as a typical electrolyte solution for a lithium ion battery, a solid electrolyte interphase (SEI) layer is also formed on a surface of the negative electrode using the silicon-based negative electrode active material as in the case of using the graphite. However, different from the graphite-based negative electrode active material in which an SEI layer is relatively stably maintained even through charge and discharge cycles, the SEI layer formed on a surface of the silicon is destroyed due to physical changes in the SEI caused by the large volume change of the active material, and, as a result, in the silicon-based negative electrode active material, there is a limitation in that electrolyte decomposition continuously occurs on the exposed surface of the active material due to the SEI layer destroyed during charge and discharge.

Therefore, with respect to the silicon-based negative electrode material, it is very important to control an additional electrolyte decomposition reaction by forming a suitable film on the surface of the negative electrode, wherein the development of an electrolyte composition will be one way to achieve this.

PRIOR ART DOCUMENT

Korean Patent Application Laid-open Publication No. 2017-0128238

DISCLOSURE OF THE INVENTION

Technical Problem

An aspect of the present invention provides a non-aqueous electrolyte solution for a lithium secondary battery which includes an additive capable of forming a stable film on a surface of a negative electrode.

Another aspect of the present invention provides a lithium secondary battery in which high-temperature storage characteristics and cycle life characteristics are improved by including the non-aqueous electrolyte solution for a lithium secondary battery.

Technical Solution

According to an aspect of the present invention, there is provided a non-aqueous electrolyte solution for a lithium secondary battery including:
  a lithium salt, an organic solvent, a first additive, and a second additive,
  wherein the first additive is lithium 4,5-dicyano-2-(trifluoromethyl)imidazolide (LiTDI), and
  the second additive is tetravinylsilane.

According to another aspect of the present invention, there is provided a lithium secondary battery including the non-aqueous electrolyte solution for a lithium secondary battery of the present invention, a positive electrode, a negative electrode, and a separator.

The negative electrode may include a silicon-based negative electrode active material and a carbon-based negative electrode active material.

Advantageous Effects

Since a non-aqueous electrolyte solution for a lithium secondary battery of the present invention includes two types of additives capable of forming a stable solid electrolyte interphase (SEI) layer on a surface of a negative electrode, a side reaction between the negative electrode and the electrolyte solution may be suppressed during high-temperature storage. Also, a lithium secondary battery, in which high-temperature storage characteristics and cycle life characteristics are improved by including the non-aqueous electrolyte solution, may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
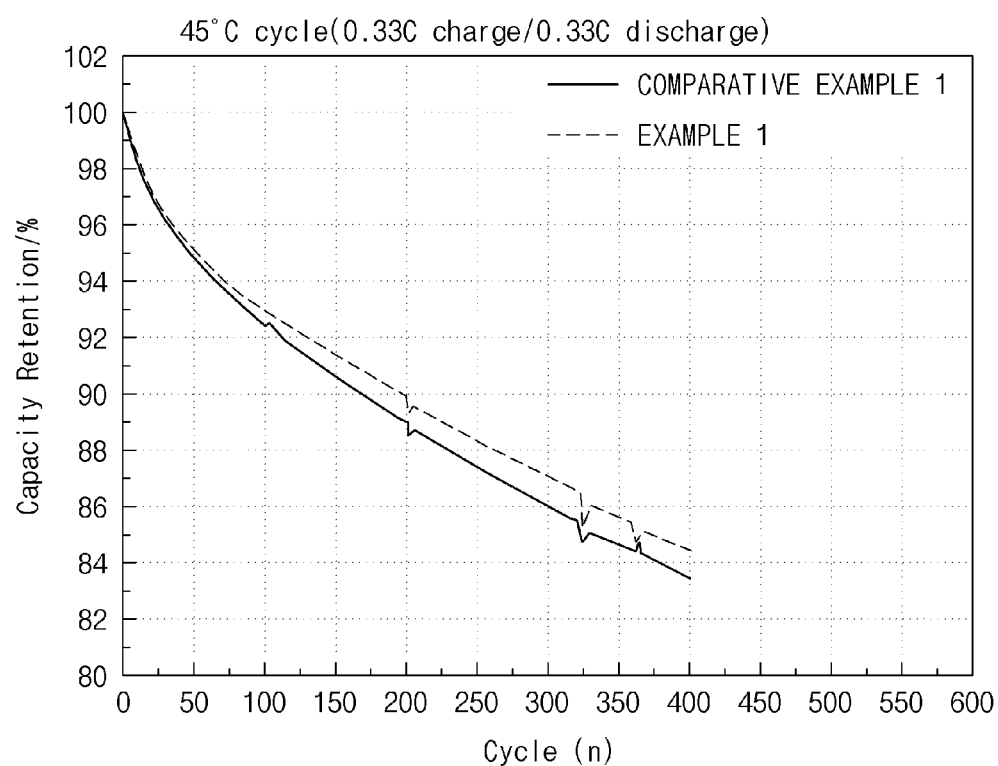
FIG. 1 is a graph illustrating the results of cycle life characteristics evaluation of Example 1 and Comparative Example 1 according to Experimental Example 1 of the present invention.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Non-Aqueous Electrolyte Solution for Lithium Secondary Battery

Specifically, in an embodiment of the present invention, provided is a non-aqueous electrolyte solution for a lithium secondary battery including:
 a lithium salt, an organic solvent, a first additive, and a second additive,
 wherein the first additive is lithium 4,5-dicyano-2-(trifluoromethyl)imidazolide; and
 the second additive is tetravinylsilane.

(1) Lithium Salt

In the non-aqueous electrolyte solution for a lithium secondary battery according to the embodiment of the present invention, any lithium salt typically used in an electrolyte solution for a lithium secondary battery may be used as the ionizable lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $PF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CH_3CO_2^-$, $C_4F_9SO_3^-$, $CF_3CO_2^-$, $SbF_6^-$, $AsF_6^-$, $AlCl_4^-$, $AlO_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $SCN^-$, and $(CF_3CF_2SO_2)_2N^-$ as an anion. Specifically, the lithium salt may include a single material selected from the group consisting of LiCl, LiBr, LiI, $LiBF_4$, $LiClO_4$, $LiPF_6$, $LiB_{10}Cl_{10}$, $LiCF_3SO_3$, $LiCH_3SO_3$, $LiCH_3CO_2$, $LiCF_3CO_2$, $LiAsF_6$, $LiSbF_6$, $LiSbF_6$, $LiAlCl_4$, and $LiAlO_4$, or a mixture of two or more thereof, and, in addition to them, an electrolyte salt, such as lithium imide salts represented by LiFSI (lithium bis(fluorosulfonyl)imide, $LiN(SO_2F)_2$), LiTFSI (lithium bis (trifluoromethanesulfonyl) imide, $LiN(SO_2CF_3)_2$), and LiBETI (lithium bisperfluoroethanesulfonimide, $LiN(SO_2CF_2CF_3)_2$), which are commonly used in an electrolyte solution of a lithium secondary battery, may be additionally used without limitation. Specifically, the electrolyte salt may include a single material selected from the group consisting of $LiPF_6$, $LiBF_4$, $LiCH_3CO_2$, $LiCF_3CO_2$, $LiCH_3SO_3$, LiFSI, LiTFSI, and LiBETI or a mixture of two or more thereof. However, the lithium salt does not include LiDFP which is included as a mixed additive.

The lithium salt may be appropriately changed in a normally usable range, but may specifically be included in a concentration of 0.1 M to 3 M, for example, 0.8 M to 2.5 M in the electrolyte solution. If, in a case in which the concentration of the lithium salt is greater than 3 M, a film formation effect may be reduced.

(2) Organic Solvent

Also, in the non-aqueous electrolyte solution for a lithium secondary battery according to the embodiment of the present invention, a type of the organic solvent is not limited as long as the organic solvent may minimize decomposition due to an oxidation reaction during charge and discharge of the secondary battery and may exhibit desired characteristics with an additive. For example, as the organic solvent, a carbonate-based organic solvent, an ether-based organic solvent, an ester-based organic solvent, or an amide-based organic solvent may be used alone or in mixture of two or more thereof.

The carbonate-based organic solvent among the organic solvents may include at least one selected from the group consisting of a cyclic carbonate-based organic solvent and a linear carbonate-based organic solvent.

The cyclic carbonate-based organic solvent is known as a solvent which well dissociates the lithium salt in the electrolyte due to high permittivity as a highly viscous organic solvent. Specific examples of the cyclic carbonate-based organic solvent may be one selected from the group consisting of ethylene carbonate (EC), 1,2-butylene carbonate, 2,3-butylene carbonate, 1,2-pentylene carbonate, 2,3-pentylene carbonate, vinylene carbonate, and fluoroethylene carbonate (FEC) or a mixture of two or more thereof, and, more specifically, the cyclic carbonate-based organic solvent may include one selected from the group consisting of ethylene carbonate, 1,2-butylene carbonate, 2,3-butylene carbonate, vinylene carbonate, and fluoroethylene carbonate (FEC) or a mixture of two or more thereof.

Also, specific examples of the linear carbonate-based organic solvent may be one selected from the group consisting of dimethyl carbonate (DMC), diethyl carbonate (DEC), dipropyl carbonate, ethyl methyl carbonate (EMC), methylpropyl carbonate, and ethylpropyl carbonate or a mixture of two or more thereof, and, more specifically, the linear carbonate-based organic solvent may include one selected from the group consisting of dimethyl carbonate, diethyl carbonate, dipropyl carbonate, and ethyl methyl carbonate or a mixture of two or more thereof.

As the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Also, the ester-based organic solvent may include at least one organic solvent selected from the group consisting of a linear ester compound and a cyclic ester compound.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

In a case in which the cyclic carbonate-based organic solvent and the low viscosity, low permittivity linear carbonate-based organic solvent, such as dimethyl carbonate and diethyl carbonate, and/or the cyclic carbonate-based organic solvent and the linear ester compound are mixed in an appropriate ratio and used, a non-aqueous electrolyte solution having higher electrical conductivity may be prepared.

As the organic solvent, the cyclic carbonate-based organic solvent and the linear carbonate-based organic solvent may be mixed and used, and a weight ratio of the cyclic carbonate-based organic solvent:the linear carbonate-based organic solvent in the organic solvent may be in a range of 10:90 to 70:30.

(3) First Additive

The non-aqueous electrolyte solution for a lithium secondary battery of the present invention may include lithium 4,5-dicyano-2-(trifluoromethyl)imidazolide represented by the following Formula 1 as a first additive.

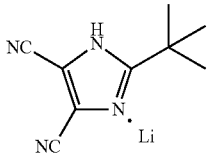

[Formula 1]

The lithium 4,5-dicyano-2-(trifluoromethyl)imidazolide may improve durability and high-temperature storage characteristics of the battery by forming a stable solid electrolyte interphase (SEI) layer on a surface of a negative electrode through a reduction reaction generated during initial charge of the negative electrode.

The first additive may be included in an amount of 0.05 wt % to 0.9 wt %, for example, 0.1 wt % to 0.9 wt % based on a total weight of the non-aqueous electrolyte solution.

The amount of the additive in the non-aqueous electrolyte solution for a lithium secondary battery may be determined by reaction specific surface areas of a positive electrode and a negative electrode, wherein, in a case in which the amount of the first additive is 0.05 wt % or more as described above, a stable SEI layer may not only be formed on the surface of the negative electrode, but expected effects resulting from the additive may also be met, for example, a gas generation reducing effect may be achieved by suppressing decomposition of the electrolyte solution due to a reaction between the electrolyte solution and the negative electrode. Also, in a case in which the amount of the additive is 0.9 wt % or less, the gas generation reducing effect may not only be improved, but a stable SEI layer may also be formed on the surface of the electrode while preventing a side reaction due to the excessive use of the additive and the resulting resistance increase.

If the amount of the additive is greater than 0.9 wt %, the gas generation reducing effect may be further improved due to the excessive amount of the additive, but, since an excessively thick layer is formed, initial resistance may be increased and output degradation may occur.

As described above, since the first additive reduces a reaction of the positive electrode with other materials by playing a role in the formation of the stable SEI layer on the surface of the negative electrode, the first additive may improve the durability of the battery. Thus, the non-aqueous electrolyte solution for a lithium secondary battery of the present invention may further include a second additive capable of assisting in forming a positive electrode layer in addition to the first additive. That is, since the non-aqueous electrolyte solution for a lithium secondary battery of the present invention may form a more stable and robust SEI layer on the surfaces of the positive electrode and the negative electrode by using the first additive and the second additive together, the non-aqueous electrolyte solution for a lithium secondary battery of the present invention may improve overall performance, such as high-temperature storage characteristics and life characteristics, of the lithium secondary battery.

(4) Second Additive

The non-aqueous electrolyte solution for a lithium secondary battery of the present invention may include tetravinylsilane (TVS) represented by the following Formula 2 as a second additive.

The tetravinylsilane (TVS) may form a robust SEI layer on the surfaces of the positive electrode and the negative electrode through physical adsorption and electrochemical reaction. Accordingly, since the tetravinylsilane may prevent exposure of the positive electrode and the negative electrode to the non-aqueous electrolyte solution, the tetravinylsilane may suppress a side reaction between the non-aqueous electrolyte solution and the electrode at high temperatures and may prevent an increase in resistance, and thus, the tetravinylsilane may improve high-temperature storage stability of the lithium secondary battery.

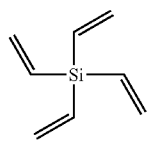

[Formula 2]

The first additive and the second additive may be used by appropriately adjusting a mixing ratio thereof in order to improve an SEI layer formation effect and to achieve effects of improving low-temperature high-rate discharge characteristics, high-temperature stability, overcharge protection, and high-temperature swelling, wherein the first additive and the second additive may be used by being mixed in a weight ratio of 1:0.1 to 1:1, for example, 1:0.2 to 1:1.

In a case in which the weight ratio of the second additive to the first additive is greater than 1, since a thick layer is formed due to the excessive amount of the second additive, the battery resistance may increase and cycle life characteristics may be degraded. Also, in a case in which the weight ratio of the second additive is less than 0.1, the gas generation reducing effect and the SEI layer formation effect may be insignificant.

In general, in a case in which a silicon-based active material is used as a negative electrode active material, a solid electrolyte interphase (SEI) layer is formed on a surface of a negative electrode during initial charge and discharge as in a case of graphite, but the SEI layer is destroyed by a change in volume of the silicon-based negative electrode active material during continuous charge and discharge. The collapse of the SEI layer allows the surface of the negative electrode to be exposed, and the exposed surface of the negative electrode causes a continuous side reaction while reacting with the electrolyte solution.

Furthermore, the side reaction continuously generates gases, and the major gases generated in this case may be CO, $CO_2$, $CH_4$, and $C_2H_6$, wherein the gases generated may vary depending on a type of the negative electrode active material, and, regardless of the type, the continuous gas generation increases an internal pressure of the lithium ion battery so that it becomes a cause of swelling of a battery thickness.

Thus, the present invention aims at forming a more robust and stable SEI layer on the surface of the negative electrode by mixing the first additive and the second additive in the above-described ratio and using the mixed ad ditive during the preparation of the non-aqueous electrolyte solution.

The stable SEI layer thus formed may suppress a degradation behavior of the battery by controlling the degradation of the battery which may occur due to the formation of an unstable SEI layer.

(5) Additional Additives

The non-aqueous electrolyte solution of the present invention may further include an additional additive which may be used with the mixed additive to form a stable layer on the surfaces of the negative electrode and the positive electrode while not significantly increasing initial resistance in addition to the effect from the mixed additive, or which may act as a complementary agent for suppressing the decomposition of the solvent in the non-aqueous electrolyte solution and improving mobility of lithium ions.

The additive is not particularly limited as long as it is an additive capable of forming a stable layer on the surfaces of the positive electrode and the negative electrode.

As a representative example, the additional additive may include at least one selected from the group consisting of a phosphate-based compound, a sulfite-based compound, a sulfone-based compound, a sulfate-based compound, a sultone-based compound, a halogen-substituted carbonate-based compound, a nitrile-based compound, a borate-based compound, and a lithium salt-based compound.

The phosphate-based compound is a component for assisting the formation of the SEI layer by being electrochemically decomposed on the surfaces of the positive electrode and the negative electrode, wherein an effect of improving long-term cycle life characteristics of the secondary battery may be achieved by the phosphate-based compound. As a representative example, the phosphate-based compound may include at least one compound selected from the group consisting of lithium difluoro(bisoxalato)phosphate, lithium difluorophosphate, tris(trim ethylsilyl) phosphate, trimethylsilyl phosphite, tris(2,2,2-trifluoroethyl) phosphate, and tris(2,2,2-trif luoroethyl) phosphite, and may specifically include lithium difluorophosphate.

The phosphate-based compound and the first additive may be included in a weight ratio of 2:1 to 5:1.

If the amount ratio of the phosphate-based compound is greater than 5, since internal resistance of the battery is increased due to the excessive use of the additive, the cycle life characteristics are degraded, and, if the amount ratio of the phosphate-based compound is less than 2, since a stabilization effect during the formation of the SEI layer is insignificant, the high-temperature storage characteristics and the cycle life characteristics may be degraded.

The sulfite-based compound may include at least one compound selected from the group consisting of ethylene sulfite, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite, and may be included in an amount of 3 wt % or less based on the total weight of the non-aqueous electrolyte solution.

The sulfone-based compound may include at least one compound selected from the group consisting of divinyl sulfone, dimethyl sulfone, diethyl sulfone, methylethyl sulfone, and methylvinyl sulfone, and may be included in an amount of 3 wt % or less based on the total weight of the non-aqueous electrolyte solution.

The sulfate-based compound may include ethylene sulfate (Esa), trimethylene sulfate (TMS), or methyl trimethylene sulfate (MTMS), and may be included in an amount of 3 wt % or less based on the total weight of the non-aqueous electrolyte solution.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone, and may be included in an amount of 0.3 wt % to 5 wt %, for example, 1 wt % to 5 wt % based on the total weight of the non-aqueous electrolyte solution. In a case in which the amount of the sultone-based compound in the non-aqueous electrolyte solution is greater than 5 wt %, an excessively thick layer may be formed on the surface of the electrode to cause an increase in resistance and a degradation of output, and resistance due to the excessive amount of the additive in the non-aqueous electrolyte solution may be increased to degrade output characteristics.

The halogen-substituted carbonate-based compound may include fluoroethylene carbonate (FEC), and may be included in an amount of 5 wt % or less based on the total weight of the non-aqueous electrolyte solution. In a case in which the amount of the halogen-substituted carbonate-based compound in the non-aqueous electrolyte solution is greater than 5 wt %, cell swelling performance may be degraded.

Also, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The borate-based compound may include lithium oxalyldifluoroborate, and may be included in an amount of 3 wt % or less based on the total weight of the non-aqueous electrolyte solution.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$, and may be included in an amount of 3 wt % or less based on the total weight of the non-aqueous electrolyte solution.

Two types or more of the additives may be mixed and included, and a total amount of the additives included may be 20 wt % or less, for example, 10 wt % or less based on the total weight of the non-aqueous electrolyte solution. If the amount of the additives is greater than 20 wt %, there is not only a possibility that a side reaction in the non-aqueous electrolyte solution occurs excessively during charge and discharge of the battery, but also, since the additives may not be sufficiently decomposed at high temperatures, the additives may be present in the form of an unreacted material or precipitates in the non-aqueous electrolyte solution at room temperature, and, accordingly, life or resistance characteristics of the secondary battery may be degraded.

Lithium Secondary Battery

Also, in the present invention, a lithium secondary battery including the above-described non-aqueous electrolyte solution may be provided.

The lithium secondary battery includes a positive electrode including a positive electrode active material, a negative electrode including a negative electrode active material, a separator disposed between the positive electrode and the negative electrode, and the above-described non-aqueous electrolyte solution.

Specifically, the lithium secondary battery of the present invention may be prepared by injecting the non-aqueous electrolyte solution of the present invention into an electrode assembly which is formed by sequentially stacking a positive electrode, a negative electrode, and a separator disposed between the positive electrode and the negative electrode. In this case, those typically used in the preparation of a lithium secondary battery may all be used as the positive electrode, negative electrode, and separator which constitute the electrode assembly.

The positive electrode and the negative electrode, which constitute the lithium secondary battery of the present invention, may be prepared by a conventional method and used.

(1) Positive Electrode

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or two or more compounds thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}CO_{1/3})O_2$, $Li(Ni0.6Mn0.2Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}Co_{0.15}Al_{0.05}$, $O_2$, etc.).

The positive electrode active material may be included in an amount of 80 wt % to 99.5 wt %, for example, 85 wt % to 95 wt % based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. If the amount of the binder is less than 1 wt %, adhesion between the electrode active material and the current collector may be insufficient, and, if the amount of the binder is greater than 30 wt %, the adhesion is improved, but, since the amount of the electrode active material is reduced by that amount, battery capacity may be reduced.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene termonomer (EPDM), a sulfonated EPDM, a styrene-butadiene rubber, a fluoro rubber, various copolymers, and the like.

Also, the conductive agent may be added in an amount of 1 wt % to 20 wt % based on the total weight of the solid content in the positive electrode slurry.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

As the solvent, N-methyl-2-pyrrolidone (NMP), dimethyl sulfoxide (DMSO), isopropyl alcohol, acetone, or water may be used alone or in a mixture thereof. An amount of the solvent used may be appropriately adjusted in consideration of a coating thickness of the slurry, manufacturing yield, and viscosity, and, for example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include a silicon-based negative electrode active material, which may be doped and undoped with lithium, and a carbon-based negative electrode active material capable of reversibly intercalating/deintercalating lithium ions.

The silicon-based negative electrode active material, which may be doped and undoped with lithium, may include at least one selected from the group consisting of silicon (Si), $SiO_x$ ($0<x\leq2$), and a Si—Y alloy (where Y is an element selected from the group consisting of alkali metal, alkaline earth metal, a Group 13 element, a Group 14 element, transition metal, a rare earth element, and a combination thereof, and is not Si).

Furthermore, as the carbon-based negative electrode active material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite-based carbon such as irregular, planar, flaky, spherical, or fibrous natural graphite, artificial graphite, or graphite, and examples of the amorphous carbon may be soft carbon (low-temperature sintered carbon) or hard carbon, mesophase pitch carbide, and fired cokes.

In this case, the silicon-based negative electrode active material and the carbon-based negative electrode active material may be included in a weight ratio of 5:95 to 50:50, particularly 20:80 to 40:60, and more particularly 30:70.

A negative electrode active material satisfying the above amount range may secure room-temperature life characteristics and high-temperature life characteristics as well as excellent capacity characteristics.

Also, in addition to the silicon-based negative electrode active material and the carbon-based negative electrode active material, the negative electrode active material may further include at least one selected from the group consisting of a tin-based material which may be doped and undoped with lithium, lithium metal, metal or an alloy of lithium and the metal, a metal composite oxide, and a transition metal oxide.

As a representative example, the tin-based material may include tin (Sn), $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. In this case, the element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), Sn, indium (In), germanium (Ge), phosphorus (P), arsenic (As), antimony (Sb), bismuth (Bi), sulfur (S), selenium (Se), tellurium (Te), polonium (Po), and a combination thereof.

As the metal or the alloy of lithium and the metal, a metal selected from the group consisting of Cu, nickel (Ni), sodium (Na), potassium (K), rubidium (Rb), cesium (Cs), francium (Fr), beryllium (Be), Mg, Ca, Sr, Si, Sb, Pb, In, Zn, Ba, Ra, Ge, Al, and Sn, or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0\leq x\leq1$), $Li_xWO_2$ ($0\leq x\leq1$), and $Sn_xMe_{1-x}Me'_yO_z$ (Me: manganese (Mn), Fe, Pb, or Ge; Me': Al, B, P, Si, Groups I, II and III elements of the periodic table, or halogen; $0<x\leq1$; $1\leq y\leq3$; $1\leq z\leq8$) may be used as the metal composite oxide.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, poly(acrylic acid sodium)/polyvinyl alcohol (Na-PAA-PVA, mixed use), hydroxypropylcellulose, regenerated cellulose, polyvinylpyrrolidone, polytetrafluoroethylene, polyethylene, polypropylene, an ethylene-propylene-diene monomer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt o, for example, 50 wt % to 65 wt %.

(3) Separator

Also, the separator plays a role in blocking an internal short circuit between both electrodes and being impregnated with the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Non-Aqueous Electrolyte Solution)

After ethylene carbonate (EC) and ethyl methyl carbonate (EMC) were mixed in a volume ratio of 30:70, a non-aqueous organic solvent was prepared by dissolving $LiPF_6$ and LIFSI in the mixture to have concentrations of 0.7 M and 0.3 M, respectively. A non-aqueous electrolyte solution for a lithium secondary battery was prepared by adding 0.5 g of lithium 4,5-dicyano-2-(trifluoromethyl)imidazolide (manufactured by Aldrich, CAS: 761441-54-7) as a first additive, 0.1 g of tetravinylsilane as a second additive, and 1.0 g of lithium difluorophosphate, 1.0 g of ethylene sulfonate, 0.5 g of 1,3-propane sultone, and 0.2 g of $LiBF_4$, as additional additives, and 6.0 g of fluorobenzene to 90.7 g of the non-aqueous organic solvent.

(Electrode Assembly Preparation)

$Li(Ni_{0.8}Co_{0.1}Mn_{0.1})O_2$ (NCM) as a positive electrode active material, carbon black as a conductive agent, and polyvinylidene fluoride (PVDF), as a binder, were added to N-methyl-2-pyrrolidone (NMP), as a solvent, at a weight ratio of 97.5:1:1.5 to prepare a positive electrode mixture slurry (solid content: 50 wt %). A 12 μm thick aluminum (Al) thin film, as a positive electrode collector, was coated with the positive electrode mixture slurry, dried, and then roll-pressed to prepare a positive electrode.

A negative electrode active material (SiO:graphite=5:95 weight ratio), SBR-CMC as a binder, and carbon black, as a conductive agent, were added in a weight ratio of 95:3.5:1.5 to water, as a solvent, to prepare a negative electrode mixture slurry (solid content: 60 wt %). A 6 μm thick copper (Cu) thin film, as a negative electrode collector, was coated with the negative electrode mixture slurry, dried, and then roll-pressed to prepare a negative electrode.

The positive electrode, a porous polyolefin-based separator coated with inorganic material particles ($Al_2O_3$), and the negative electrode were sequentially stacked to prepare an electrode assembly.

(Secondary Battery Preparation)

The assembled electrode assembly was accommodated in a battery case, and the non-aqueous electrolyte solution was injected thereinto to prepare a pouch type lithium secondary battery.

Example 2

A non-aqueous electrolyte solution and a pouch type lithium secondary battery including the same were prepared in the same manner as in Example 1 except that 0.2 g of lithium 4,5-dicyano-2-(trifluoromethyl)imidazolide as a first additive, 0.1 g of tetravinylsilane as a second additive, and 1.0 g of lithium difluorophosphate, 1.0 g of ethylene sulfonate, 0.5 g of 1,3-propane sultone, and 0.2 g of $LiBF_4$, as additional additives, and 6.0 g of fluorobenzene were added to 91.0 g of the non-aqueous organic solvent.

Example 3

(Preparation of Non-aqueous Electrolyte Solution)

A non-aqueous electrolyte solution for a lithium secondary battery was prepared by adding 0.5 g of lithium 4,5-dicyano-2-(trifluoromethyl)imidazolide as a first additive, 0.1 g of tetravinylsilane as a second additive, and 1.0 g of lithium difluorophosphate, as an additional additive, to 98.4 g of a non-aqueous organic solvent.

(Negative Electrode Preparation)

A negative electrode active material (SiO:graphite=30:70 weight ratio), poly(acrylic acid sodium)-polyvinyl alcohol as a binder, and carbon black, as a conductive agent, were added in a weight ratio of 95:3.5:1.5 to water, as a solvent, to prepare a negative electrode mixture slurry. A 6 μm thick copper (Cu) thin film, as a negative electrode collector, was coated with the negative electrode mixture slurry, dried, and then roll-pressed to prepare a negative electrode.

(Electrode Assembly Preparation)

The negative electrode prepared, a porous polyolefin-based separator coated with inorganic material particles ($Al_2O_3$), and the positive electrode prepared in Example 1 were sequentially stacked to prepare an electrode assembly.

(Secondary Battery Preparation)

The assembled electrode assembly was accommodated in a battery case, and the non-aqueous electrolyte solution was injected thereinto to prepare a pouch type lithium secondary battery.

Example 4

A non-aqueous electrolyte solution for a lithium secondary battery and a pouch type lithium secondary battery including the same were prepared in the same manner as in Example 1 except that 1.0 g of lithium 4,5-dicyano-2-(trifluoromethyl)imidazolide as a first additive, 0.2 g of tetravinylsilane as a second additive, and 1.0 g of lithium difluorophosphate, 1.0 g of ethylene sulfonate, 0.5 g of 1,3-propane sultone, and 0.2 g of $LiBF_4$, as additional additives, and 6.0 g of fluorobenzene were added to 90.1 g of the non-aqueous organic solvent.

Comparative Example 1

A non-aqueous electrolyte solution for a lithium secondary battery and a pouch type lithium secondary battery including the same were prepared in the same manner as in Example 1 except that the first additive was not included, and 0.1 g of tetravinylsilane as a second additive, and 1.0 g of lithium difluorophosphate, 1.0 g of ethylene sulfonate, 0.5 g of 1,3-propane sultone, and 0.2 g of $LiBF_4$, as additional additives, and 6.0 g of fluorobenzene were added to 91.2 g of the non-aqueous organic solvent.

Comparative Example 2

(Preparation of Non-aqueous Electrolyte Solution)

A non-aqueous electrolyte solution for a lithium secondary battery was prepared by adding 0.5 g of lithium oxalyldifluoroborate (LiODFB), 0.1 g of tetravinylsilane as a second additive, and 1.0 g of lithium difluorophosphate, 1.0 g of ethylene sulfonate, 0.5 g of 1,3-propane sultone, and 0.2 g of $LiBF_4$, as additional additives, and 6.0 g of fluorobenzene to 90.7 g of a non-aqueous organic solvent.

(Secondary Battery Preparation)

A pouch type lithium secondary battery was prepared in the same manner as in Example 1 except that the above non-aqueous electrolyte solution was used.

Comparative Example 3

(Preparation of Non-Aqueous Electrolyte Solution)

A non-aqueous electrolyte solution for a lithium secondary battery was prepared by adding 0.5 g of lithium bis(oxalato)borate (LiBOB), 0.1 g of tetravinylsilane as a second additive, and 1.0 g of lithium difluorophosphate, 1.0 g of ethylene sulfonate, 0.5 g of 1,3-propane sultone, and 0.2 g of $LiBF_4$, as additional additives, and 6.0 g of fluorobenzene to 90.7 g of a non-aqueous organic solvent.

(Secondary Battery Preparation)

A pouch type lithium secondary battery was prepared in the same manner as in Example 1 except that the above non-aqueous electrolyte solution was used.

Reference Example (Negative Electrode Preparation)

A negative electrode active material (graphite), SBR-CMC as a binder, and carbon black, as a conductive agent, were added in a weight ratio of 95:3.5:1.5 to water, as a solvent, to prepare a negative electrode mixture slurry. A 6 μm thick copper (Cu) thin film, as a negative electrode collector, was coated with the negative electrode mixture slurry, dried, and then roll-pressed to prepare a negative electrode.

(Secondary Battery Preparation)

A pouch type lithium secondary battery was prepared in the same manner as in Example 3 except that the above-prepared negative electrode was used.

Experimental Examples

Experimental Example 1

Cycle Life Characteristic Test (1)

After each of the lithium secondary battery prepared in Example 1 and the secondary battery prepared in Comparative Example 1 was activated at 0.1 C rate under a constant current (CC) condition, degas was performed.

Subsequently, each secondary battery was charged at 0.33 C rate under a CC condition to 4.20 V under a constant current-constant voltage (CC-CV) condition at 25° C., then subjected to 0.05 C current cut-off, and discharged at 0.33 C rate under a CC condition to 2.5 V. The above charging and discharging were set as one cycle, and 3 cycles were performed.

Next, each secondary battery was charged at 0.33 C rate under a CC condition to 4.20 V under a constant current-constant voltage (CC-CV) condition at 45° C., then subjected to 0.05 C current cut-off, and discharged at 0.33 C under a CC condition to 2.5 V. The above charging and discharging were set as one cycle, and 400 cycles of charging and discharging were performed at a high temperature (45° C.)

In this case, capacity was measured every 100 cycles using PNE-0506 charge/discharge equipment (manufacturer: PNE SOLUTION Co., Ltd., 5 V, 6 A), and the capacity was substituted into the following Equation (1) to calculate capacity retention, and the results thereof are presented in FIG. 1.

$$\text{Capacity retention}(\%)=(\text{capacity every 100 cycles}/\text{capacity after one cycle})\times 100 \quad \text{Equation (1):}$$

Also, discharge capacity was measured every 100 cycles using PNE-0506 charge/discharge equipment (manufacturer: PNE SOLUTION Co., Ltd., 5 V, 6 A), and the discharge capacity was substituted into the following Equation (2) to calculate discharge capacity retention, and the results thereof are presented in FIG. 2.

$$\text{Discharge capacity retention}(\%)=(\text{discharge capacity every 100 cycles}/\text{discharge capacity after one cycle})\times 100 \quad \text{Equation (2):}$$

Furthermore, direct current internal resistance (hereinafter, referred to as "DC-iR") was calculated using a voltage drop obtained in a state in which each secondary battery was subjected to a discharge pulse at 2.5 C for 10 seconds at a state of charge (SOC) of 50%, the DC-iR was substituted into the following Equation (3) to calculate a resistance increase rate (%), and the results thereof are presented in FIG. 2. In this case, the voltage drop was measured using PNE-0506 charge/discharge equipment (manufacturer: PNE SOLUTION Co., Ltd., 5 V, 6 A).

$$\text{Resistance increase rate (\%)} = \{(\text{resistance after every 100 cycles-initial resistance})/\text{initial resistance}\} \times 100 \quad \text{Equation (3):}$$

Referring to FIG. 1, with respect to the secondary battery of Example 1 including the non-aqueous electrolyte solution of the present invention, since an irreversible loss of lithium due to the additional decomposition of the electrolyte was smaller than that of the secondary battery of Comparative Example 1 even after 400 cycles at a high temperature (45° C.), it may be confirmed that the capacity retention of the battery was improved.

Figure 2:
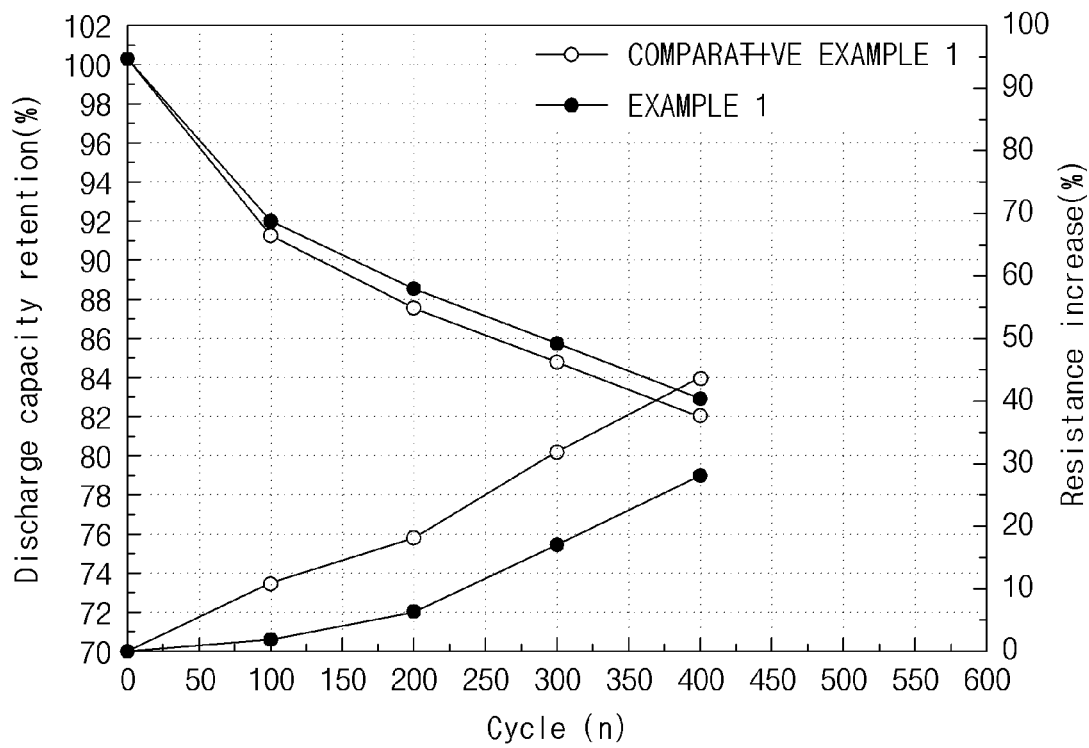
FIG. 2 is a graph illustrating the results of discharge capacity retention and resistance characteristics evaluation of Example 1 and Comparative Example 1 according to Experimental Example 1 of the present invention.

Also, referring to FIG. 2, with respect to the secondary battery of Example 1, since a stable layer was formed on the surfaces of the positive electrode/the negative electrode, capacity retention was improved in comparison to that of the secondary battery of Comparative Example 1 even after 400 cycles at a high temperature (45° C.) and a resistance increase rate was about 27%, wherein it may be confirmed that the resistance increase rate was significantly reduced in comparison to that of the secondary battery of Comparative Example 1

Experimental Example 2

Cycle Life Characteristic Test (2)

After each of the lithium secondary battery prepared in Example 2 and the secondary battery prepared in Comparative Example 1 was activated at 0.1 C rate under a CC condition, degas was performed.

Subsequently, each secondary battery was charged at 0.33 C rate under a CC condition to 4.20 V under a constant current-constant voltage (CC-CV) condition at 25° C., then subjected to 0.05 C current cut-off, and discharged at 0.33 C under a CC condition to 2.5 V. The above charging and discharging were set as one cycle, and 3 cycles were performed.

Next, each secondary battery was charged at 0.33 C rate under a CC condition to 4.20 V under a constant current-constant voltage (CC-CV) condition at 45° C., then subjected to 0.05 C current cut-off, and discharged at 0.33 C under a CC condition to 2.5 V. The above charging and discharging were set as one cycle, and 50 cycles of charging and discharging were performed at a high temperature (45° C.)

In this case, capacity was measured every 10 cycles using PNE-0506 charge/discharge equipment (manufacturer: PNE SOLUTION Co., Ltd., 5 V, 6 A), and the capacity was substituted into Equation (1) to calculate capacity retention, and the results thereof are presented in FIG. 3.

Figure 3:
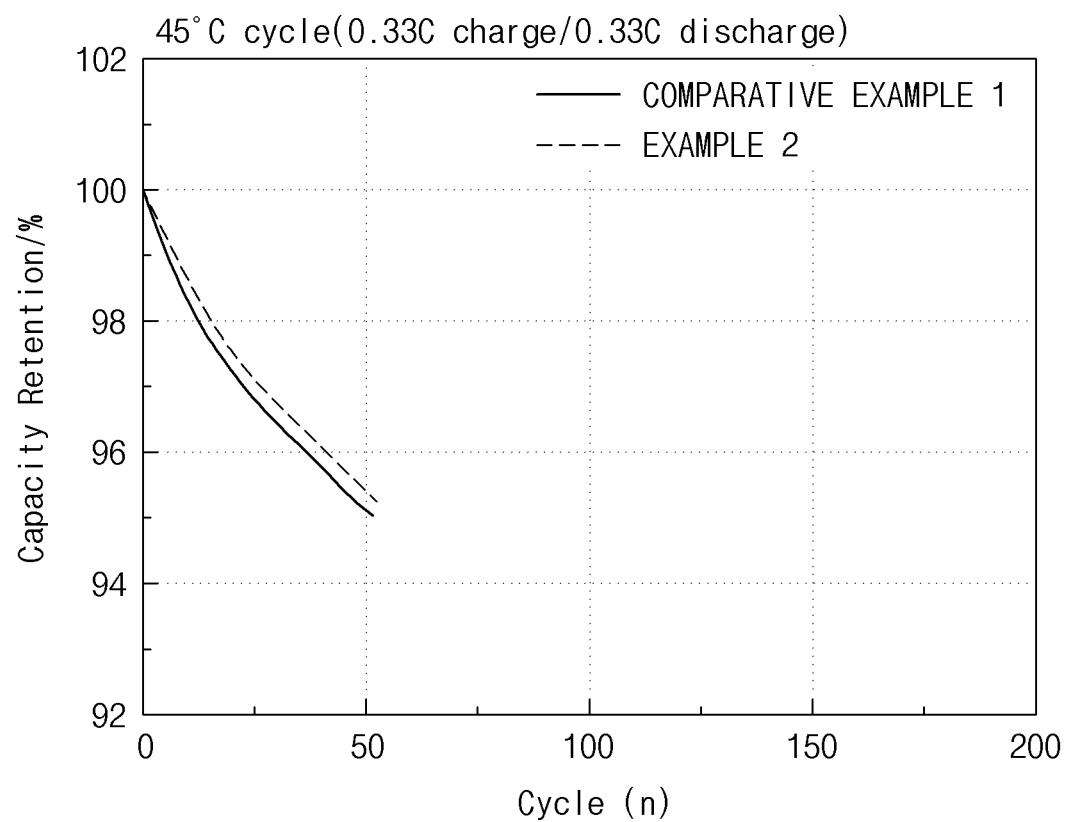
FIG. 3 is a graph illustrating the results of cycle life characteristics evaluation of Example 2 and Comparative Example 1 according to Experimental Example 2 of the present invention.

Referring to FIG. 3, with respect to the secondary battery of Example 2 of the present invention, since a stable layer was formed on the surfaces of the positive electrode/the negative electrode, a continuous electrolyte decomposition reaction due to the destruction and regeneration of the layer was suppressed even if continuous charge and discharge were performed at high temperature, and thus, it may be confirmed that capacity retention was improved in comparison to that of the secondary battery of Comparative Example 1.

Experimental Example 3

High-Temperature Storage Characteristic Test

After each of the secondary batteries prepared in Example 1 and Comparative Example 1 was activated at 0.1 C rate under a CC condition, degas was performed.

Subsequently, each secondary battery was charged at 0.33 C rate under a CC condition to 4.20 V under a constant current-constant voltage (CC-CV) condition at 25° C., then subjected to 0.05 C current cut-off, and discharged at 0.33 C under a CC condition to 2.5 V. The above charging and discharging were set as one cycle, and 3 cycles were performed.

Next, each secondary battery was recharged at 0.33 C rate under a CC condition to a SOC of 100% and then stored at a high temperature of 60° C. for 12 weeks.

After CC-CV charge and discharge were performed at 0.33 C rate every two weeks, discharge capacity was measured using PNE-0506 charge/discharge equipment (manufacturer: PNE SOLUTION Co., Ltd., 5 V, 6 A), the discharge capacity was substituted into Equation (2) to measure discharge capacity retention, and the results thereof are presented in FIG. 4.

Figure 4:
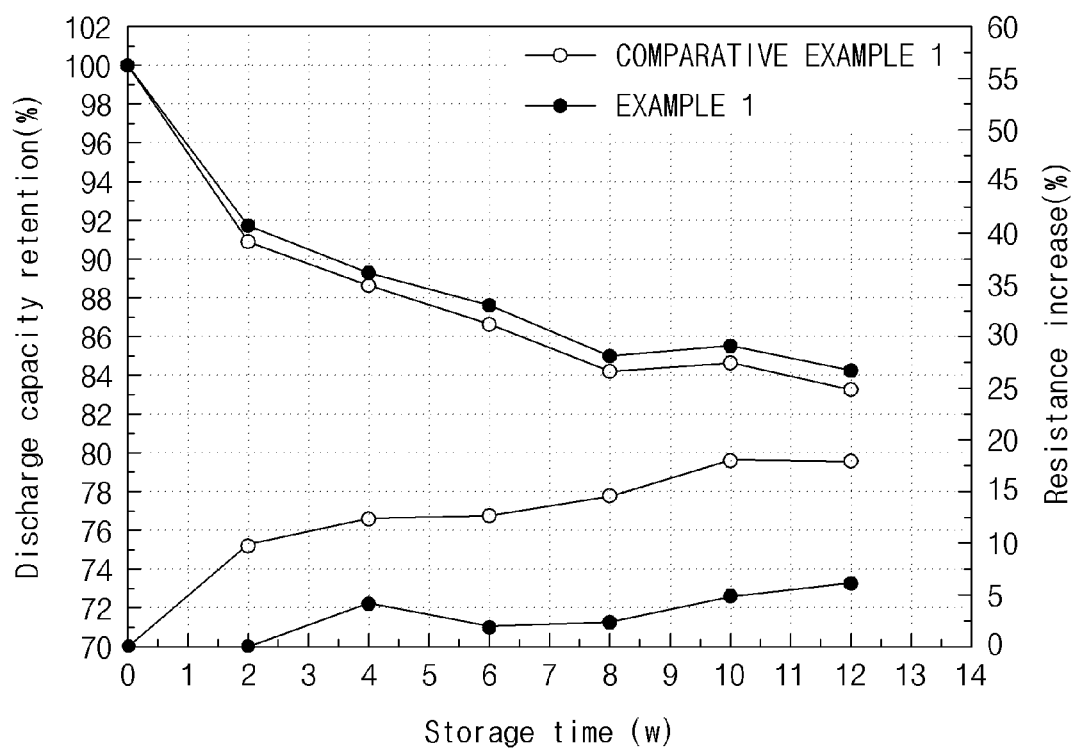
FIG. 4 is a graph illustrating the results of discharge capacity retention and resistance characteristics evaluation after high-temperature storage according to Experimental Example 3 of the present invention.

Also, DC-iR was calculated using a voltage drop obtained in a state in which each secondary battery was subjected to a discharge pulse at 2.5 C for 10 seconds at a SOC of 50%, the DC-iR was substituted into Equation (3) to calculate a resistance increase rate (%), and the results thereof are presented in FIG. 4. In this case, the voltage drop was measured using PNE-0506 charge/discharge equipment (manufacturer: PNE SOLUTION Co., Ltd., 5 V, 6 A).

Figure 5:
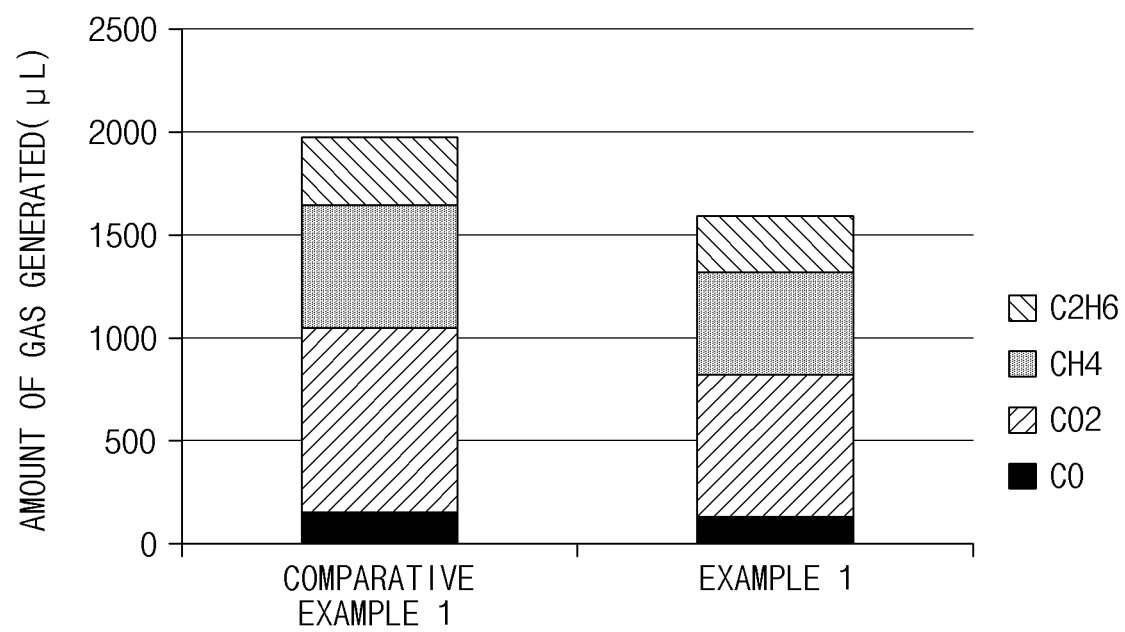
FIG. 5 is a graph illustrating the results of measuring an amount of gas generated after high-temperature storage according to Experimental Example 3 of the present invention.

Furthermore, after the secondary batteries of Example and Comparative Example 1 were partially opened and degassed when 12 weeks passed after the high-temperature storage, amounts of gases generated in each battery and extracted components were compared and presented in FIG. 5.

First, referring to FIG. 4, a resistance increase rate after 12 weeks storage at high temperature of the secondary battery of Example 1 including the non-aqueous electrolyte solution of the present invention was about 6%, wherein it may be understood that the resistance increase rate was significantly reduced in comparison to that of the secondary battery of Comparative Example 1. Also, a capacity retention after 8 weeks storage at high temperature of the secondary battery of Example 1 was about 84%, wherein it may be understood that the capacity retention was improved in comparison to that of the secondary battery of Comparative Example 1. The reason for this is that, with respect to the secondary battery of Example 1 including the non-aqueous electrolyte solution of the present invention, since an SEI layer, which was more stable than that of the secondary battery of Comparative Example 1, was formed on the surface of the negative electrode, the destruction of the layer at high temperature was prevented and the resulting additional decomposition of the electrolyte was suppressed, and thus, the resistance increase rate was reduced and the capacity retention was increased.

Also, referring to FIG. 5, with respect to the secondary battery of Example 1 including the non-aqueous electrolyte solution of the present invention, since a stable layer was formed on the surfaces of the positive electrode/the negative electrode to reduce the decomposition of the electrolyte during high-temperature storage, amounts of $CO_2$ and $CH_4$, which were generated due to the decomposition of the electrolyte solution in the battery, were 650 µl and 550 µl, respectively, wherein it may be understood that the amounts were respectively reduced in comparison to those of the secondary battery of Comparative Example 1 in which amounts of $CO_2$ and $CH_4$ generated were 870 µl and 690 µl, respectively.

Experimental Example 4

High-Temperature Storage Characteristic Test

After each of the secondary batteries prepared in Example 4 and Comparative Example 1 was activated at a CC of 0.1 C, degas was performed.

Subsequently, each secondary battery was charged at a CC of 0.33 C to 4.20 V under a constant current-constant voltage (CC-CV) condition at 25° C., then subjected to 0.05 C current cut-off, and discharged at 0.33 C under a CC condition to 2.5 V. The above charging and discharging were set as one cycle, and 3 cycles were performed.

Next, each secondary battery was recharged at a CC of 0.33 C to a SOC of 100% and then stored at a high temperature of 60° C. for 8 weeks.

After CC-CV charge and discharge were performed at 0.33 C rate every two weeks, discharge capacity was measured using PNE-0506 charge/discharge equipment (manufacturer: PNE SOLUTION Co., Ltd., 5 V, 6 A), the discharge capacity was substituted into Equation (2) to measure discharge capacity retention, and the results thereof are presented in FIG. 6.

Figure 6:
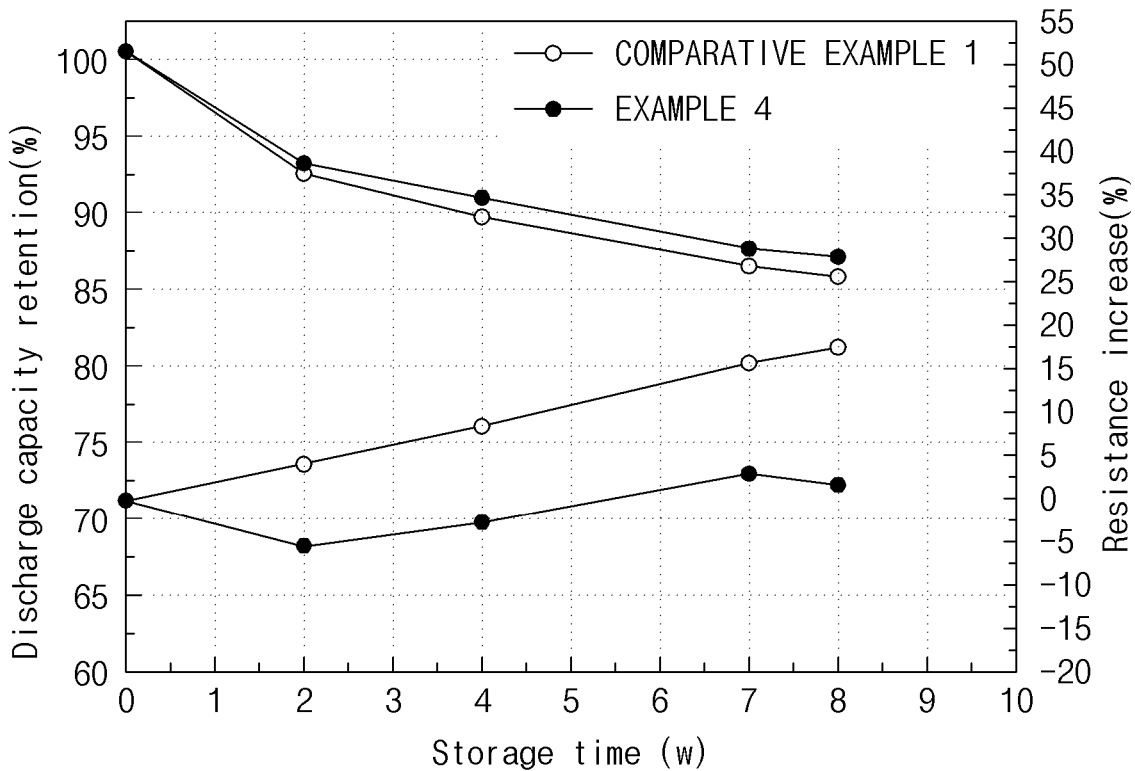
FIG. 6 is a graph illustrating the results of discharge capacity retention and resistance characteristics evaluation after high-temperature storage according to Experimental Example 4 of the present invention.

Also, DC-iR was calculated using a voltage drop obtained in a state in which each secondary battery was subjected to a discharge pulse at 2.5 C for 10 seconds at a SOC of 50%, the DC-iR was substituted into Equation (3) to calculate a resistance increase rate (%), and the results thereof are presented in FIG. 6. In this case, the voltage drop was measured using PNE-0506 charge/discharge equipment (manufacturer: PNE SOLUTION Co., Ltd., 5 V, 6 A).

Referring to FIG. 6, a resistance increase rate after 8 weeks storage at high temperature of the secondary battery of Example 4 was about 3% or less, wherein it may be understood that the resistance increase rate was significantly reduced in comparison to that of the secondary battery of Comparative Example 1. Also, it may be understood that a capacity retention after 8 weeks storage at high temperature of the secondary battery of Example 4 was improved in comparison to that of the secondary battery of Comparative Example 1. The reason for this is that, with respect to the secondary battery of Example 4 including the non-aqueous electrolyte solution of the present invention, since an SEI layer, which was more stable than that of the secondary battery of Comparative Example 1, was formed on the surface of the negative electrode, the destruction of the layer at high temperature was prevented and the resulting additional decomposition of the electrolyte was suppressed, and thus, the resistance increase rate was reduced and the capacity retention was increased.

Experimental Example 5

Initial Resistance Measurement Test

After each of the secondary batteries prepared in Example 1 and Example 4 was activated at 0.1 C rate under a CC condition, each secondary battery was charged at 0.33 C rate under a CC condition to 4.20 V under a constant current-constant voltage (CC-CV) condition at 45° C., then subjected to 0.05 C current cut-off, and discharged at 0.33 C under a CC condition to 2.5 V.

Figure 7:
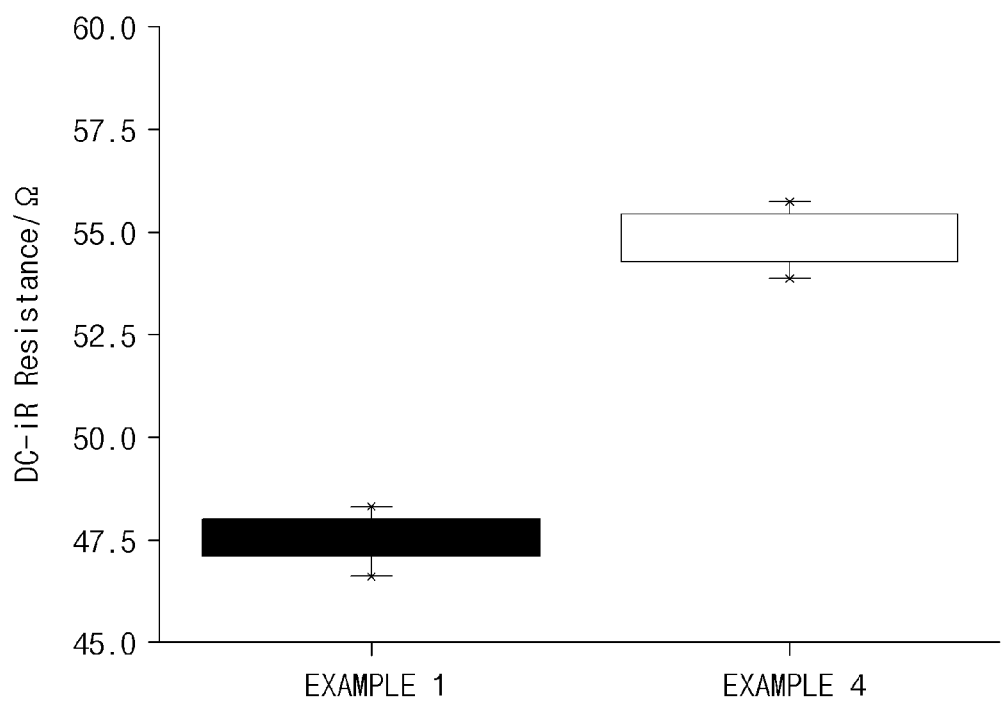
FIG. 7 is a graph illustrating the results of initial resistance evaluation according to Experimental Example 5 of the present invention.

After the above charging and discharging were set as one cycle and 3 cycles were performed, initial resistance was calculated using a voltage drop obtained in a state in which each secondary battery was subjected to a discharge pulse at 2.5 C rate under a CC condition for 10 seconds at a SOC of 50%, and the results thereof are presented in FIG. 7. In this case, the voltage drop was measured using PNE-0506 charge/discharge equipment (manufacturer: PNE SOLUTION Co., Ltd., 5 V, 6 A).

Referring to FIG. 7, with respect to the secondary battery of Example 4 including the non-aqueous electrolyte solution having a large amount of the first additive, it may be confirmed that the initial resistance was increased.

Experimental Example 6. Evaluation of Effect of Forming SEI Layer on the Negative Electrode Surface After each of the secondary batteries prepared in Example 3 and Reference Example was CC-CV charged at 0.1 C to 4.2 V to be activated with 0.05 C cut-off, degas was performed.

Subsequently, capacity was measured using PNE-0506 charge/discharge equipment (manufacturer: PNE SOLUTION Co., Ltd., 5 V, 6 A), and a differential capacity curve, which was obtained by performing the first derivative of a capacity-voltage curve thus obtained, was illustrated in FIG. 8.

Figure 8:
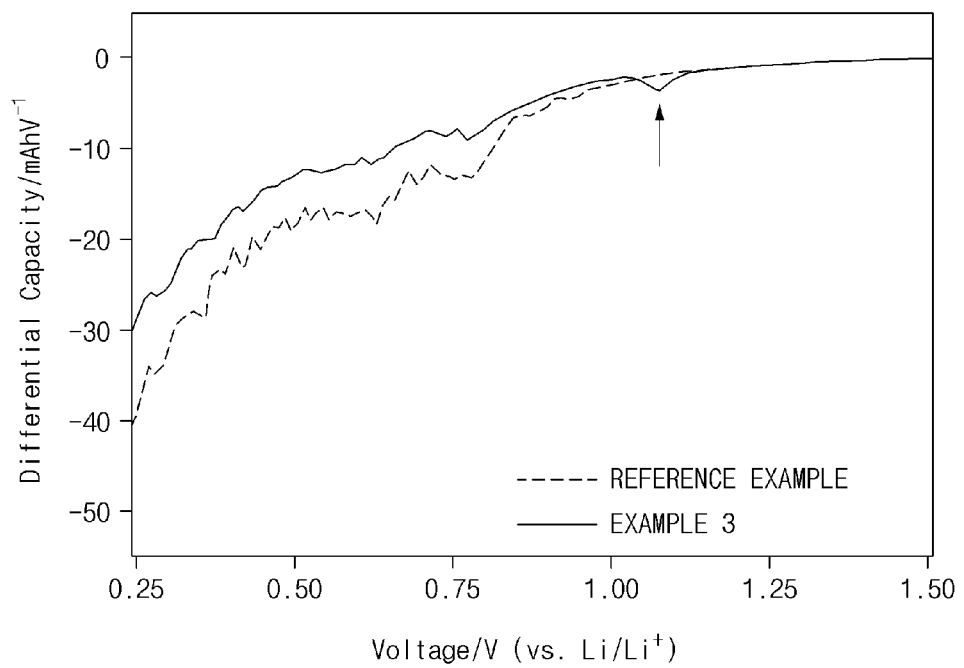
FIG. 8 is a graph illustrating an effect of forming a solid electrolyte interphase (SEI) layer on a surface of a negative electrode according to Experimental Example 6 of the present invention.

Referring to FIG. 8, with respect to the secondary battery of Example 3 which included the negative electrode containing a silicon component (SiO), a decomposition peak, showing that the additives included in the non-aqueous electrolyte solution were decomposed and reduced on the surface of the negative electrode between about 1.00 V and about 1.25 V, was confirmed in comparison to the secondary battery of Reference Example which included the negative electrode containing a graphite component alone. Accordingly, it may be confirmed that the non-aqueous electrolyte solution of the present invention may additionally form a stable SEI layer on the negative electrode in which the silicon component is mixed.

Experimental Example 7

Resistance Evaluation Test After High-temperature Cycles

After each of the lithium secondary batteries prepared in Example 1 and Comparative Examples 1 to 3 was activated at 0.1 C rate under a CC condition, degas was performed.

Subsequently, each secondary battery was charged at 0.33 C rate under a CC condition to 4.20 V under a constant current-constant voltage (CC-CV) condition at 25° C., then subjected to 0.05 C current cut-off, and discharged at 0.33 C under a CC condition to 2.5 V. The above charging and discharging were set as one cycle, and 3 cycles were performed.

Next, each secondary battery was charged at 0.33 C rate under a CC condition to 4.20 V under a constant current-constant voltage (CC-CV) condition at 45° C., then subjected to 0.05 C current cut-off, and discharged at 0.33 C under a CC condition to 2.5 V. The above charging and discharging were set as one cycle, and 300 cycles of charging and discharging were performed at a high temperature (45° C.)

Subsequently, direct current internal resistance (hereinafter, referred to as "DC-iR") was calculated using a voltage drop obtained in a state in which each secondary battery was subjected to a discharge pulse at 2.5 C for 10 seconds at a SOC of 50%, the DC-iR was substituted into Equation (3) to calculate a resistance increase rate (%), and the results thereof are presented in FIG. 9. In this case, the voltage drop was measured using PNE-0506 charge/discharge equipment (manufacturer: PNE SOLUTION Co., Ltd., 5 V, 6 A).

Figure 9:
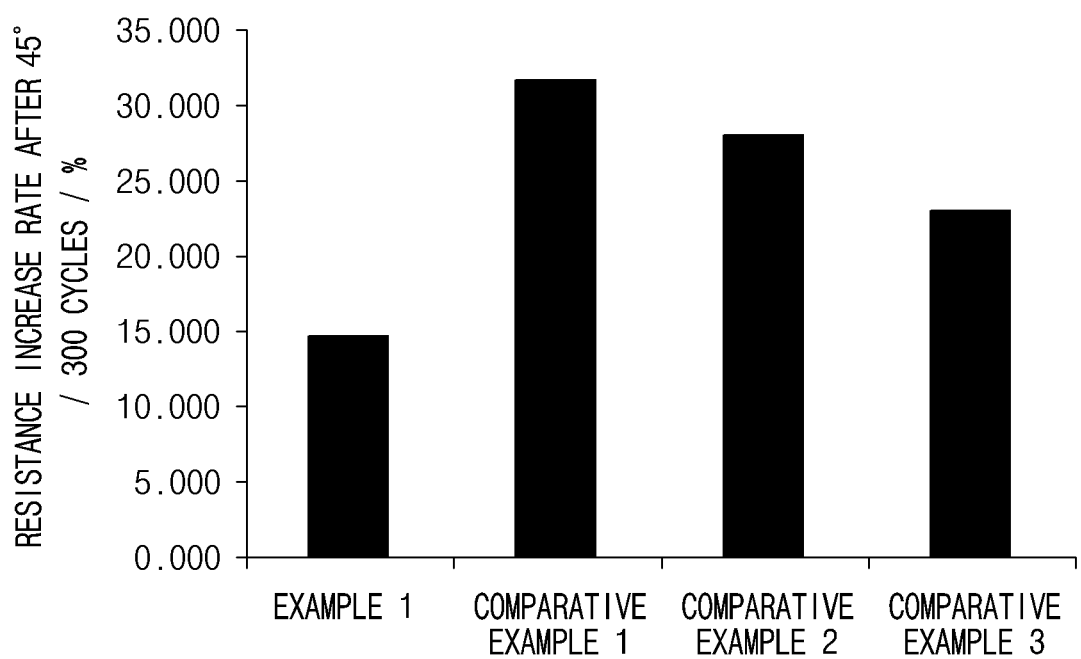
FIG. 9 is a graph illustrating the results of resistance evaluation of secondary batteries according to Experimental Example 7 of the present invention.

Referring to FIG. 9, with respect to the secondary battery of Comparative Example 1, which did not include the first additive, and the secondary batteries of Comparative Examples 2 and 3 respectively including the borate-based compounds different from the first additive, it may be confirmed that resistances after 300 cycles at high temperature were increased in comparison to that of the secondary battery of Example 1.

The invention claimed is:

1. A lithium secondary battery, comprising:
a non-aqueous electrolyte solution;
a positive electrode;
a negative electrode; and
a separator,
wherein the non-aqueous electrolyte solution comprises:
a lithium salt;
an organic solvent;
a first additive; and
a second additive,
wherein the first additive is lithium 4,5-dicyano-2-(trifluoromethyl)imidazolide, and the second additive is tetravinylsilane, and
wherein the negative electrode comprises a negative electrode active material, wherein the negative electrode active material comprises a carbon-based negative electrode active material, and at least one of silicon (Si) or SiOx ($0<x\leq2$).

2. The lithium secondary battery of claim 1, wherein the at least one of silicon (Si) or SiOx ($0<x\leq2$), and the carbon-based negative electrode active material are present in a weight ratio of 5:95 to 50:50.

3. The lithium secondary battery of claim 2, wherein the at least one of silicon (Si) or SiOx ($0<x\leq2$), and the carbon-based negative electrode active material are present in a weight ratio of 20:80 to 40:60.

4. The lithium secondary battery of claim 1, wherein the first additive is present in an amount of 0.05 wt % to 0.9 wt % based on a total weight of the non-aqueous electrolyte solution.

5. The lithium secondary battery of claim 1, wherein the first additive is present in an amount of 0.1 wt % to 0.9 wt % based on a total weight of the non-aqueous electrolyte solution.

6. The lithium secondary battery of claim 1, wherein a weight ratio of the first additive to the second additive is in a range of 1:0.1 to 1:1.

7. The lithium secondary battery of claim 1, wherein a weight ratio of the first additive to the second additive is in a range of 1:0.2 to 1:1.

8. The lithium secondary battery of claim 1, wherein the non-aqueous electrolyte solution further comprises at least one additional additive of a phosphate-based compound, a sulfite-based compound, a sulfone-based compound, a sulfate-based compound, a sultone-based compound, a halogen-substituted carbonate-based compound, a nitrile-based compound, a borate-based compound, or a lithium salt-based compound.

* * * * *